(12) United States Patent
Ivanov et al.

(10) Patent No.: US 10,621,234 B2
(45) Date of Patent: Apr. 14, 2020

(54) METHOD FOR DISCOVERING A GROUP OF INTERDEPENDENT COMPUTING OBJECTS WITHIN UNDIRECTED GRAPH STRUCTURE IN A COMPUTING ENVIRONMENT CORRESPONDING TO A SET OF KNOWN CONDITIONS

(71) Applicant: Runecast Solutions Limited, London (GB)

(72) Inventors: Konstantin Ivanov, Brno (CZ); Marek Duris, Brno (CZ); Aylin Sali, Brno (CZ); Stanimir Markov, Sliven (BG); Ionut Radu, Sasar (RO)

(73) Assignee: RUNECAST SOLUTIONS LIMITED, London (GB)

( * ) Notice: Subject to any disclaimer, the term of this patent is extended or adjusted under 35 U.S.C. 154(b) by 245 days.

(21) Appl. No.: 15/947,485

(22) Filed: Apr. 6, 2018

(65) Prior Publication Data
US 2019/0311069 A1 Oct. 10, 2019

(51) Int. Cl.
*G06F 16/901* (2019.01)
*G06F 16/188* (2019.01)
(Continued)

(52) U.S. Cl.
CPC ........ *G06F 16/9024* (2019.01); *G06F 16/188* (2019.01); *G06F 16/284* (2019.01); *G06F 16/289* (2019.01); *G06F 16/90335* (2019.01)

(58) Field of Classification Search
CPC .. G06F 16/9024; G06F 3/048; G06K 9/00771
See application file for complete search history.

(56) References Cited

U.S. PATENT DOCUMENTS 5,717,914 A 2/1998 Husick et al.
7,966,291 B1 6/2011 Petrovic et al.
(Continued)

OTHER PUBLICATIONS

Notification of Transmittal of the International Search Report and the Written Opinion, of the International Searching Authority, or the Declaration dated Aug. 28, 2019 for International Appl. No. PCT/2019/0026273.
(Continued)

*Primary Examiner* — Etienne P Leroux
(74) *Attorney, Agent, or Firm* — Kramer Amado, P.C.

(57) ABSTRACT

Various embodiments relate to a method and apparatus for discovering a group of interdependent computing objects within an undirected graph structure of objects in a computing environment, the method comprising the steps of performing object identification, performing relations identification, selecting objects by performing the steps comprising defining required properties, matching the required properties with the properties for each of the objects, dropping the objects which have at least one of the properties which do not match with the required properties, making a selection by performing object intersection on the objects by performing the steps of reading location and the relations for each of the objects, selecting a group including each of the objects in the sets of objects which are identical based on the relations for each of the objects, determining whether each of the objects in the group are related to each of the objects in each of the sets of objects, and determining whether at least one of the objects in each of the sets of objects is related to at least one of the objects in another set of the sets of objects.

18 Claims, 6 Drawing Sheets

(51) Int. Cl.
*G06F 16/28* (2019.01)
*G06F 16/903* (2019.01)

(56) References Cited

U.S. PATENT DOCUMENTS

| | | | |
|---|---|---|---|
| 8,775,427 B2 | 7/2014 | Birdwell | |
| 8,788,527 B1 | 7/2014 | Nadel et al. | |
| 9,135,280 B2 | 9/2015 | Milenova et al. | |
| 9,165,034 B2 | 10/2015 | Edwards et al. | |
| 9,652,316 B2 | 5/2017 | Gamage | |
| 2007/0273696 A1* | 11/2007 | Cheng | G06K 9/00771 |
| | | | 345/467 |
| 2008/0016026 A1 | 1/2008 | Farber et al. | |
| 2008/0208882 A1 | 8/2008 | Zhang et al. | |
| 2010/0274815 A1 | 10/2010 | Vanasco | |
| 2011/0154236 A1* | 6/2011 | Stoeck | G06F 3/048 |
| | | | 715/771 |
| 2011/0302168 A1 | 12/2011 | Aggarwal | |
| 2012/0047149 A1 | 2/2012 | Zhou et al. | |

OTHER PUBLICATIONS

Blau, "A Visual Query Language for Relational Knowledge Discovery", University of Massachusetts-Amherst, Computer Science Department Faculty Publication Series, 2001, 17 pages.

Curtis-Maury, "Online Power-Performance Adaptation of Multithreaded Programs using Event-Based Prediction", Queen's University Belfast, Published in Proceedings of the 20th ACM International Conference on Supercomputing (ICS), 2006, 11 pages.

Jennings, "An Agent-Based Approach for Building Complex Software Systems", Communications of the ACM, Apr. 2001, vol. 44, No. 4, pp. 35-41.

* cited by examiner

METHOD FOR DISCOVERING A GROUP OF INTERDEPENDENT COMPUTING OBJECTS WITHIN UNDIRECTED GRAPH STRUCTURE IN A COMPUTING ENVIRONMENT CORRESPONDING TO A SET OF KNOWN CONDITIONS

TECHNICAL FIELD

This disclosure relates generally to getting and reading objects, object types, object relations and the values of their properties from systems such as for example computer systems that have a large configuration trees with many objects of different types and properties of those objects, and more specifically, but not exclusively, to an Organization Area ("OA") which is analyzed in the form of a graph where the vertices are defined by objects and the edges are defined by objects relations.

BACKGROUND

Modern systems such as computer systems have an extensive number of configuration parameters which are known to systems administrators. To optimize performance of computer systems, the methods of reading single values of known parameters and selections of multiple parameters with a high frequency must be optimized.

SUMMARY

A brief summary of various embodiments is presented below. Embodiments address a method and apparatus for discovering a group of interdependent objects within an undirected graph structure of objects corresponding to a set of known conditions.

A brief summary of various example embodiments is presented. Some simplifications and omissions may be made in the following summary, which is intended to highlight and introduce some aspects of the various example embodiments, but not to limit the scope of the invention.

Detailed descriptions of example embodiments adequate to allow those of ordinary skill in the art to make and use the inventive concepts will follow in later sections.

Various embodiments described herein relate to a method for discovering a group of interdependent computing objects within an undirected graph structure of objects in a computing environment, the method comprising the steps of performing object identification, performing relations identification, selecting objects by performing the steps comprising defining required properties and matching the required properties with the properties for each of the objects, dropping the objects which have at least one of the properties which do not match with the required properties, making a selection by performing object intersection on the objects by performing the steps of reading location and the relations for each of the objects, selecting a group including each of the objects in the sets of objects which are identical based on the relations for each of the objects, determining whether each of the objects in the group are related to each of the objects in each of the sets of objects and determining whether at least one of the objects in each of the sets of objects is related to at least one of the objects in another set of the sets of objects.

In an embodiment of the present disclosure, the method for discovering a group of interdependent computing objects within an undirected graph structure of objects in the computing environment, the method comprising the steps of performing the object identification by performing the steps comprising receiving a search query including objects and operators, selecting an organization area, isolating object types for the objects in the search query, grouping the objects into sets of objects and recording properties for each of the objects.

In an embodiment of the present disclosure, the method for discovering a group of interdependent computing objects within an undirected graph structure of objects in the computing environment, the method comprising the steps of performing the relations identification by performing the steps comprising recording relatability for each of the object types for the objects, and recording relations for each of the objects.

In an embodiment of the present disclosure, the method for discovering a group of interdependent computing objects within an undirected graph structure of objects in the computing environment, the method comprising the steps of making a selection by performing object intersection on the objects by performing the steps of dropping all of the objects from the group when each of the objects in the group are not related to each of the objects in each of the sets of objects.

In an embodiment of the present disclosure, the method for discovering a group of interdependent computing objects within an undirected graph structure of objects in the computing environment, the method comprising the steps of making a selection by performing object intersection on the objects by performing the steps of dropping all of the objects from the group when each of the sets of objects is not related to at least one of the objects in another set of the sets of objects.

In an embodiment of the present disclosure, the method for discovering a group of interdependent computing objects within an undirected graph structure of objects in the computing environment, the method comprising the steps of making a selection by performing object union on the objects by performing the steps of reading location and the relations for each of the objects and selecting each of the objects that are in each of the sets of objects.

In an embodiment of the present disclosure, the method for discovering a group of interdependent computing objects within an undirected graph structure of objects in the computing environment, the method comprising the steps of making a selection by performing object union on the objects by performing the steps of dropping each of the objects that are not in each of the sets of objects.

In an embodiment of the present disclosure, the method for discovering a group of interdependent computing objects within an undirected graph structure of objects in the computing environment, the method comprising the steps of making a selection by performing object combination on the objects by performing the steps of reading location and the relations for each of the objects, selecting each of the objects that are in each of the sets of objects, and determining whether each of the objects in a first set of objects is related to at least one the objects in a second set of objects.

In an embodiment of the present disclosure, the method for discovering a group of interdependent computing objects within an undirected graph structure of objects in the computing environment of claim 8, the method comprising the steps of making a selection by performing object combination on the objects by performing the steps of dropping each of the objects in a first set of objects which is not related to at least one the objects in a second set of objects.

Various embodiments described herein relate to non-transitory computer readable medium configured discovering a group of interdependent computing objects within an undirected graph structure in a computing environment, the device comprising a memory; and a processor configured to perform object identification by performing the steps comprising perform relations identification by performing the steps comprising make a selection by performing object intersection on the objects by performing the steps of reading location and the relations for each of the objects, selecting a group including each of the objects in the sets of objects which are identical based on the relations for each of the objects, determining whether each of the objects in the group are related to each of the objects in each of the sets of objects, and determining whether at least one of the objects in each of the sets of objects is related to at least one of the objects in another set of the sets of objects.

In an embodiment of the present disclosure, the non-transitory computer readable medium, the processor configured to perform object identification by performing the steps comprising receiving a search query including objects and operators, selecting an organization area, isolating object types for the objects in the search query, grouping the objects into sets of objects, and recording properties for each of the objects.

In an embodiment of the present disclosure, the non-transitory computer readable medium, the processor configured to perform relations identification by performing the steps comprising recording relatability for each of the object types for the objects, recording relations for each of the objects.

In an embodiment of the present disclosure, the non-transitory computer readable medium, the processor configured to make a selection by performing object intersection on the objects by performing the steps of dropping all of the objects from the group when each of the objects in the group are not related to each of the objects in each of the sets of objects.

In an embodiment of the present disclosure, the non-transitory computer readable medium, the processor configured to make a selection by performing object intersection on the objects by performing the steps of dropping all of the objects from the group when each of the sets of objects is not related to at least one of the objects in another set of the sets of objects.

In an embodiment of the present disclosure, the non-transitory computer readable medium, the processor configured to make a selection by performing object intersection on the objects by performing the steps of reading location and the relations for each of the objects, and selecting each of the objects that are in each of the sets of objects.

In an embodiment of the present disclosure, the non-transitory computer readable medium, the processor configured to make a selection by performing object intersection on the objects by performing the steps of dropping each of the objects that are not in each of the sets of objects.

In an embodiment of the present disclosure, the non-transitory computer readable medium, the processor configured to make a selection by performing object intersection on the objects by performing the steps of reading location and the relations for each of the objects, selecting each of the objects that are in each of the sets of objects, and determining whether each of the objects in a first set of objects is related to at least one the objects in a second set of objects.

In an embodiment of the present disclosure, the non-transitory computer readable medium, the processor configured to make a selection by performing object intersection on the objects by performing the steps of dropping each of the objects in a first set of objects which is not related to at least one the objects in a second set of objects.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate example embodiments of concepts found in the claims, and explain various principles and advantages of those embodiments.

These and other more detailed and specific features are more fully disclosed in the following specification, reference being had to the accompanying drawings, in which.

DETAILED DESCRIPTION

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable.

The embodiments described herein disclose the usage of set operations to define how to isolate and identify interconnected objects from an OA of a computer system. These objects may or may not share other objects of the OA, which may influence the search result. While, embodiments are described using a computer system, the methods disclosed in the embodiments may be applied to other complex systems that have interrelated objects of different types that need to be identified.

There are two types of operations which are used in the method, union and intersection. Both union and intersection are possible within one query, while within intersection, the current embodiment implements a variance to a standard set of mathematical operations to consider a broader set of objects of various types belonging to different logical sets.

An OA is an area spanned by the computer system which includes an enclave of objects that are visible by having access credentials (e.g., a software system or interconnected configuration items structure) that can process expected functions.

A configuration object is a part of the OA that serves a partial function of the OA and is needed to provide declared functionality of the OA. Each object in the OA is of a specific type which determines its functionality, thus belonging to a specific set of objects of the same type, function and/or purpose. Objects in the OA may be nested, however, the number of nesting layers (i.e., object within object within object) is not limited.

A configuration object property is an attribute of the object that defines a value of the object's setting to guarantee the required system state or behavior.

A sentence is a computer readable transcription of recorded knowledge from various sources, mostly using natural language, which defines a subset of objects.

A query is a process of execution of a sentence on the OA and processing the results.

A relation is a logical link between two objects that constitutes their interconnection for the given OA configuration (i.e., pertaining to the objects). The relation indicates the interdependency of the two objects for the correct function for the particular sentence. A relation can only exist between two objects whose function logically and technically allows them to be interconnected.

A set is a selection of objects by their type. Each set may contain only objects of the same type.

A group is a selection of objects from multiple sets pertaining to one query. Each group can consist of objects from multiple sets, therefore, having objects of multiple types within the same group.

A sentence is an input for each configuration search (i.e., query). A sentence sets what objects by type and properties must be identified before query processing, how their relations will be recorded and what selectors (i.e., operations) will be made over them.

The embodiments described herein provide a method for finding all relevant objects, their types and value of properties. These objects are all known and are part of the same OA. Each object has one type and multiple properties different or the same from one another. Each object also determines to which other objects it may be related, to provide expected OA functionality.

There may be relatable objects and non-relatable objects.

Relatable objects (e.g., a network server connects with data stores which hold data) and non-relatable objects (e.g., a network client server which does not connect to the network server's data store, it only connects to the network server itself).

Relatability includes some differences to the objects relations.

For example, in the case of sets of relatable object types, the query returns an object only if each described set of objects of a given object type contains at least one object after the operation. If any of the sets are empty (i.e., there is not at least one object of each type in the set), the query returns an empty set of objects.

In the case of sets of non-relatable object types, sets of non-relatable objects cannot have any relations between each other. The query returns objects only if each described set of objects of a given object type contains at least one object after the operation. The sets of relatable objects must still fulfill the condition of being interconnected among each other.

In either case, the result of the whole query is not an empty set when all the objects within the group, which may be related to each other (logically or technically), are related. Only objects whose types cannot have a relation remain in the unrelated group.

The resulting set, after the query processing, is based on the mathematical operations of union (|) and intersection (&) of objects collections. The query addresses 2 . . . n objects of the OA and defines a logical structure to optimize the value search.

The resulting set is a set of objects sharing the same type or different types, which were used for the object identification.

Unlike standard mathematics operations, the intersection of an object resulting in a new set of resulting objects is not limited to a set of objects of the same type but may be altered to become a set of objects of different types and members of other sets, if they share logical interconnection. Therefore, a blend of objects of different types will be returned in case they form a logical entity within the OA that works in conjunction to provide a working item.

The operation (r-AND) of intersection to create resulting sets of objects that do not need to share the same type depending on whether logical links amongst those exist creates these resulting sets. The logical link is determined by the type of OA.

This embodiment may be applied to systems that have a large number of objects, a large number of properties of the objects with various values that can be assumed, a large number of relations among objects, a high change rate of number of objects, relations and values of objects properties and a low number of types or objects which are steady in time.

This embodiment uses two sets of operations: $\&_R$ (operation r-AND) and ∩ which is a standard set union operator.

For example, there are five sets of objects, of which three sets are of type A and two sets are of type B: $A_1, A_2, A_3, B_1, B_2$ where the goal is to intersect the sets: $A_1 \&_R A_2 \&_R B_1 \&_R A_3 \&_R B_2$ which would not be possible, because they are not of the same type and the result would not return the intersection. Therefore, a decomposition and relation must be performed before the standard intersection can be applied:

Below is an example of an evaluation of unrelated types (i.e., decomposition to objects of same types for standard set operations).

| Sets of objects → | Each set is a results of different queries | Result |
|---|---|---|
| Sentence | $A_1 \&_R A_2 \&_R B_1 \&_R A_3 \&_R B_2$ | |
| Types of objects ↓ | Each set from the row above contains objects of the type in the rows below | |
| A | $a_1, a_2 \cap a_1, a_3 \cap \_\_\_ \cap a_1, a_2, a_5 \cap \_\_\_$ | $a_1$ |
| B | $\_\_\_ \cap \_\_\_ \cap b_1, b_2, b_5 \cap \_\_\_ \cap b_1, b_2$ | $b_1, b_2$ |

The sentence evaluation result is a1, b1, b2.

Below is an example of an evaluation of related types (i.e., substitution of missing objects by related objects of the other types).

| Sets of objects → | Each set is a results of different queries | Result |
|---|---|---|
| Sentence | $A_1 \&_R A_2 \&_R B_1 \&_R A_3 \&_R B_2$ | |
| Types of objects ↓ | Since operations cannot contain objects of other types than its own, relationships must be included to complete operations | |
| A | $a_1, a_2 \cap a_1, a_3 \cap a_1, a_2, a_5 \cap a_1, a_2, a_5 \cap a_1, a_2$ | $a_1$ |
| Implementing relations | Relation of all objects of type A towards each related object of type B will be determined, and the other way round, filling the gaps in the other operation ↑↓. | |
| B | $b_1, b_2, b_4 \cap b_1 \cap b_1, b_2, b_5 \cap b_1, b_2, b_4, b_5 \cap b_1, b_2$ | $b_1$ |

The sentence evaluation result is a1, b1.

However, values of embedded systems' properties are not the only determinator of their state.

A manual configuration option may be used to determine objects parameters, where needed. meaning that in addition to autonomous discovery of identifiable objects, the final result may be influenced by the configuration area, system users, administrators, owners who may add manually defined properties and their values to each of the object. These manually added parameters may be treated the same way as objects' own, preset, properties into the formula.

These queries may be mathematically chained together (i.e., stacking the principle into layers encompassing different sets but computed within a single run), each query may work with different or identical objects within their own sets and combine the result with results of other queries, limiting the number of result objects and minimizing it to the least number sharing the searched parameters.

Figure 1:
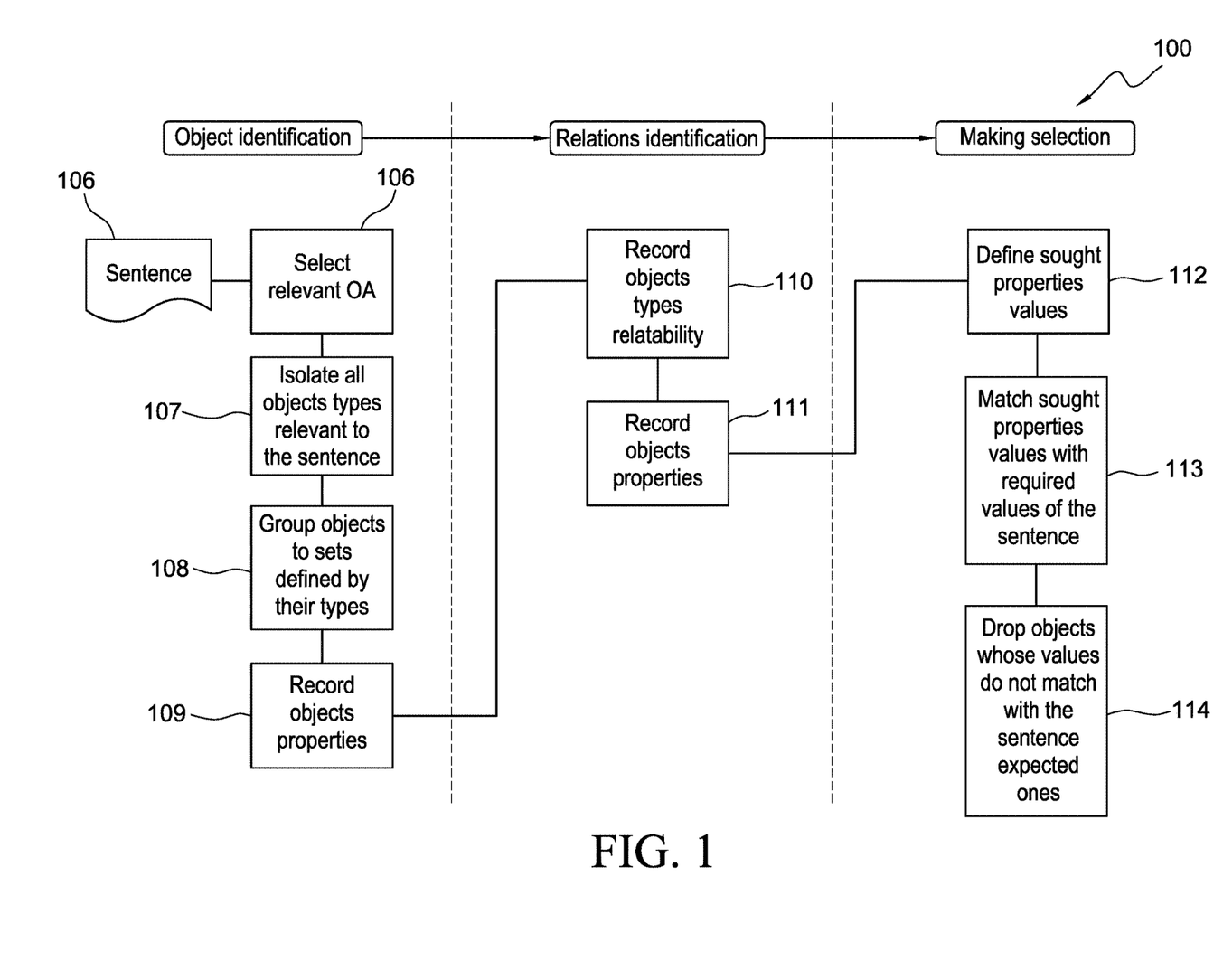
FIG. 1 illustrates a flowchart of the object identification process, the relations identification process and the making selection process of the current embodiment.

FIG. 1 illustrates a flowchart of the object identification process, the relations identification process and the making selection process of the current embodiment.

Figure 2:
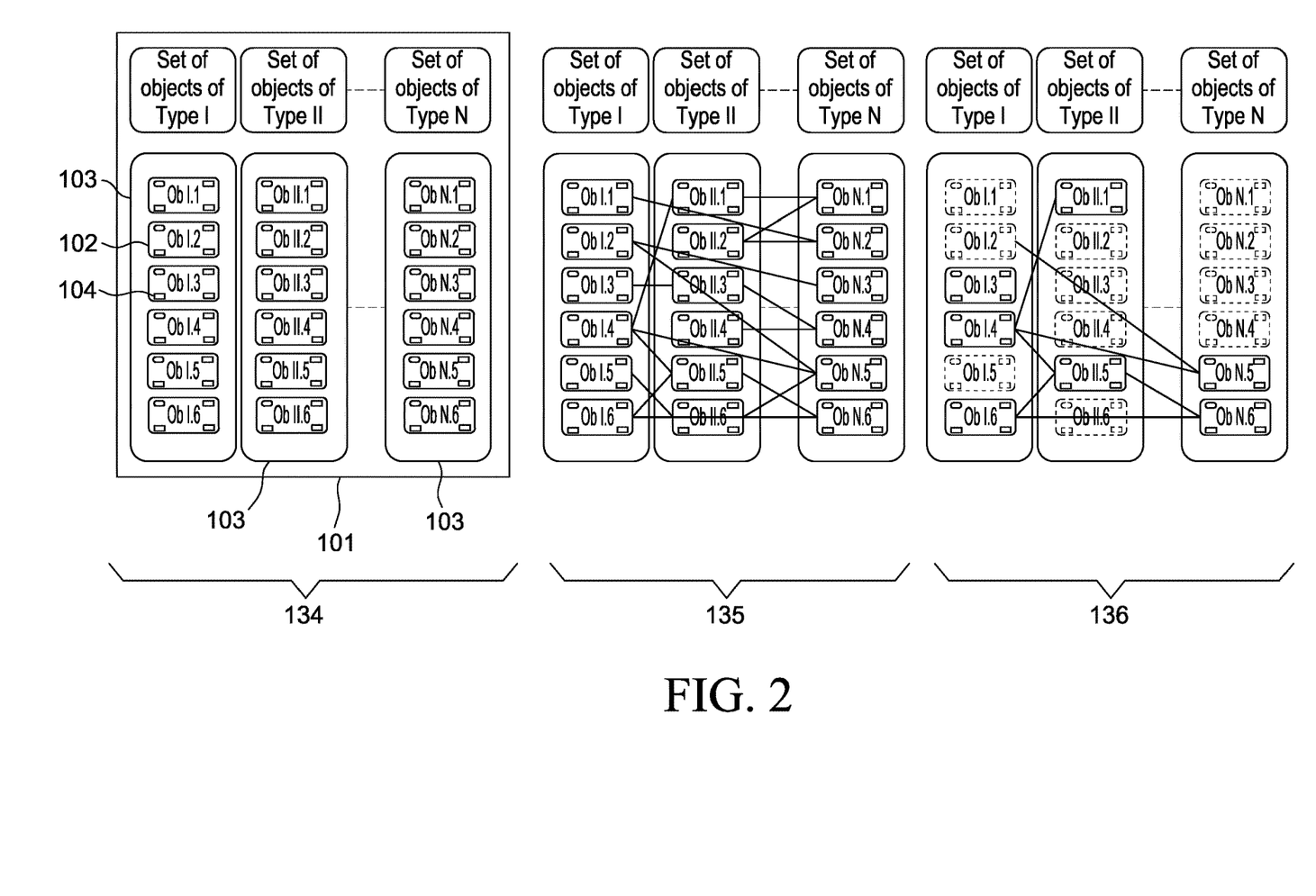
FIG. 2 illustrates the results of the object identification process, the relations identification process and the making selection process of the current embodiment.

FIG. 2 illustrates an organization area 101 (e.g., a computer system), consisting of objects 102 (e.g., Ob I.1 to Ob N.6). These objects 102 may be grouped by their type into sets of objects 103 (e.g., from SO1 to SON). Each object 102 may have a set of properties 104 that may assume various values of defined types. More than one different set of objects 103 may contain objects 102 of the same type; however, those same types of objects may not necessarily be only grouped in one set of objects 103.

The property 104 values influence behavior of objects 102. All types of objects 102 are interconnectable and therefore there exists logical and technical relations among them.

Each search query is defined by a sentence with operators. FIG. 2 uses three different queries 134, 135 and 136 resulting in three final sets of filtered objects.

FIG. 1 illustrates a flowchart 100 which begins at step 105 by receiving a sentence (i.e., a search query). The flowchart 100 continues to step 106 which selects relevant the OA. The flowchart 100 continues to step 107 which isolates all object types which are relevant to the sentence. The flowchart 100 continues to step 108 which groups objects to sets by their types. The flowchart 100 continues to step 109 which records object properties.

The outcome of object identification is illustrated in organization area 134 in FIG. 2.

The input sets of objects are defined by knowing which of them are within the scope of the sentence. They are grouped by their type which determines their nature and behavior. SO1, SO2 to SON are sets of the objects of the same type. Those sets do not have to be exclusive and there can be more than one set of objects grouping objects of the same type. All objects represent technical entities (e.g., physical, logical or proprietarily defined) of the system that belong to the OA that is being examined.

In an example, the OA may represent a data center which includes a physical layer (e.g., physically tangible assets), computing devices (e.g., consisting of processors, memory, various bridges and I/O parts, etc.), storage devices (e.g., spinning or flash drives, cache memory, firmware, controllers, CD-ROM, magnetic tape, etc.), network devices (e.g., switches, routers, operating systems, firmware), and networking fabric (e.g., wires, fibers).

Virtualization layers are logical assets allowing physical resource sharing and isolation for various processes which are provided by various software systems (e.g., Microsoft Windows with HyperV, VMware ESXi, Linux KVM, Citrix XEN, VMware NSX, Cisco ACI, Juniper NFC, etc.). The result of the combination of physical and virtualization layers may be, but not limited to, virtual computing nodes (i.e., hosts), virtual network devices, virtual storage, virtual end user computer desktops.

Virtualized layers are logical systems that resemble otherwise physical devices managed by a software controlling system and are transparent to human users or software application (i.e., virtual computer, server or desktop, storage drive, network connection) that run normal software for human users (i.e., database engines, web servers, web pages, CRM, ERP, mail servers, user interfaces, etc.).

Objects sets can represent whichever items from these layers and types for each sentence that is being examined. In FIG. 2, 103 may be Microsoft HyperV servers, 103 may be Microsoft Windows 2012 servers and 103 may be CD-ROMs.

The sentence to be examined will query all Microsoft HyperV virtualization servers, all virtual computers (running MS Windows servers 2012) and all data stores (i.e., hard drives), that exist within the OA.

For example, if an OA represents a town. There are plants, roads, houses, trains, persons, animals, cars and also many other objects of different types in the town. The particular sentence to be examined queries all objects of these three types: houses, cars, persons.

Relevant objects are interconnected as per the OA topology. OA topology is given by its setup and will not change for different sentences.

The flowchart 100 continues to step 110 which records the object types relatability. The flowchart 100 continues to step 111 which records object relations.

The outcome of relations identification is in organization area 135 in FIG. 2.

In the example above, the relations will show which virtualization server is hosting which Windows server and which data store (i.e., hard drive) is mounted to any of virtualization host and/or Windows server.

For example, the relations show the use-based relation structure: cars driven by persons, houses inhabited by persons and cars parked in houses. All these relations are bi-directional.

Each object is identified based on knowledge of the subject (either human or computed) and left in the input set, if it qualifies. This is decided based on properties of the objects in connection with the expectations from the sentence.

The flowchart 100 continues to step 112 which defines the sought property values. The flowchart 100 continues to step 113 which matches sought property values with required values of the sentences. The flowchart 100 continues to step 114 which drops objects whose values do not match with the sentence expected ones.

The outcome of making a selection is illustrated in organization area 136 in FIG. 2.

In the example above, only those virtualization servers which have release dates before October 2016, Windows servers which run MS database server and data store which have a NTFS filesystem stay in the sets, the others are dropped for this query.

For example, only those selected objects that have properties of: detached houses, SUV cars, female persons stay in the sets as the objects of our interest.

FIG. 2 illustrates the results of the object identification process, the relations identification process and the making selection process of the current embodiment.

In FIG. 2, all objects are identified in the organization area 134.

In FIG. 2, all objects relations are identified in the organization area 135.

In FIG. 2, all objects in organization area 136 except Ob I.2, 4 and 6; Ob II.1 and 2; Ob N.5 and 6 are dropped from the selection.

In the example above, only the virtualization servers which have a release date before October 2016, Windows servers which run Microsoft database server and data stores which have a NTFS filesystem remain in the sets, the others are dropped for this query.

For example, only those female persons that inhabit detached houses and use SUV cars, which are sheltered in the same houses are kept.

Figure 3:
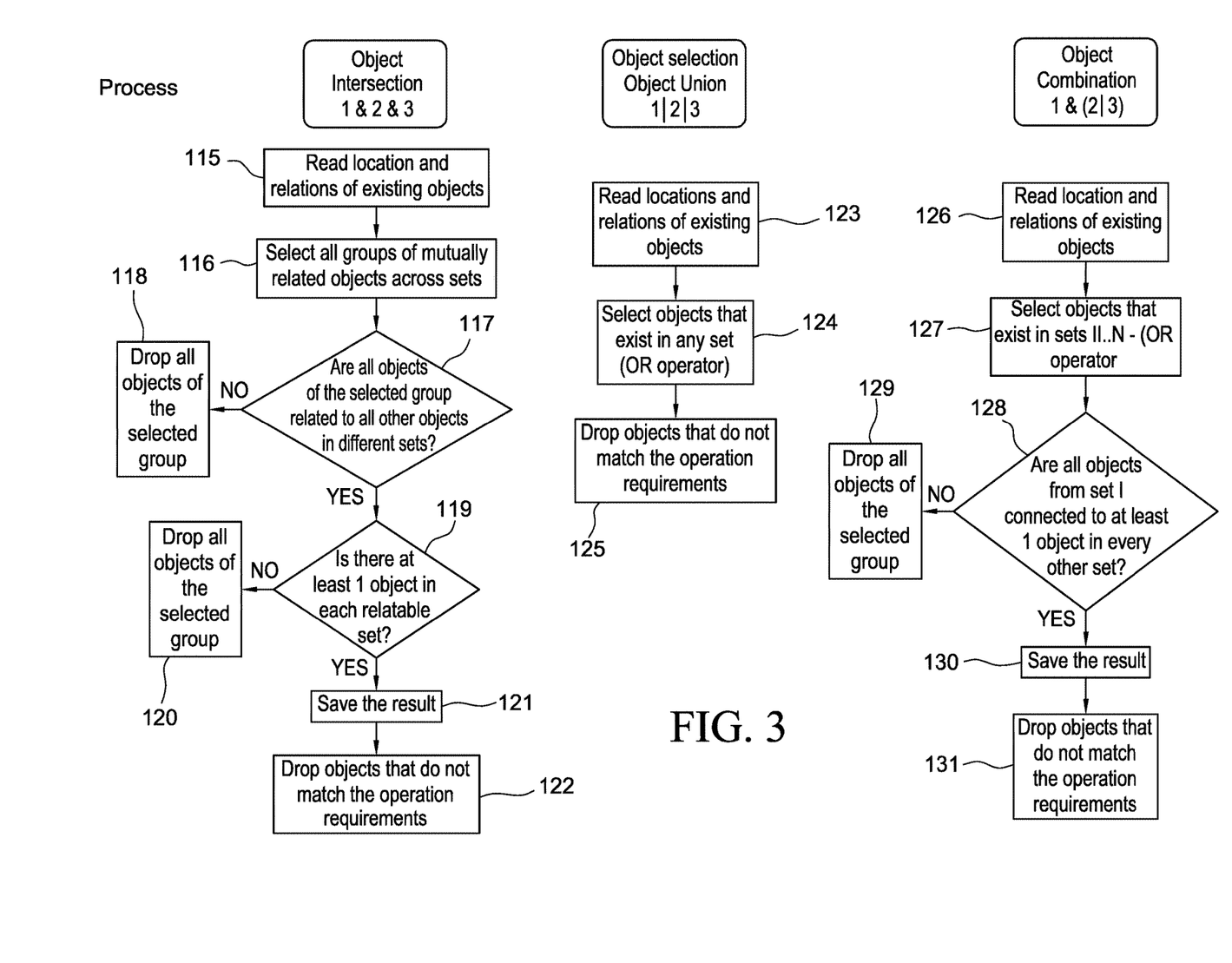
FIG. 3 illustrates a flowchart for each of the three types of object selection, including object intersection, object union and object combination.

FIG. 3 illustrates a flowchart for each of the three types of object selection, including object intersection, object union and object combination (which is a combination of intersection and union operators in a more complex sentence).

Object intersection means that only the objects that have relation between each other in the other sets of objects (i.e., all to all relation) will be left after the operation.

If object intersection is selected, the flowchart 100 proceeds from step 114 and continues to step 115 which reads location and relations of existing objects. The flowchart 100 continues to step 116 which selects all groups of mutually related objects across sets. The flowchart continues to step 117 which determines whether all objects of the selected group are related to all other objects in different sets. If not, the flowchart proceeds to step 118 which drops all objects of the selected groups.

If yes, the flowchart 100 proceeds to step 119 which determines whether there is at least one object in each relatable set. If no, the method proceeds to step 120 which drops all objects of the selected groups.

If yes, the flowchart 100, proceeds to step 121 which saves the result. The flowchart 100 then proceeds to step 122 which drops all objects that do not match the operation requirements.

Figure 4:
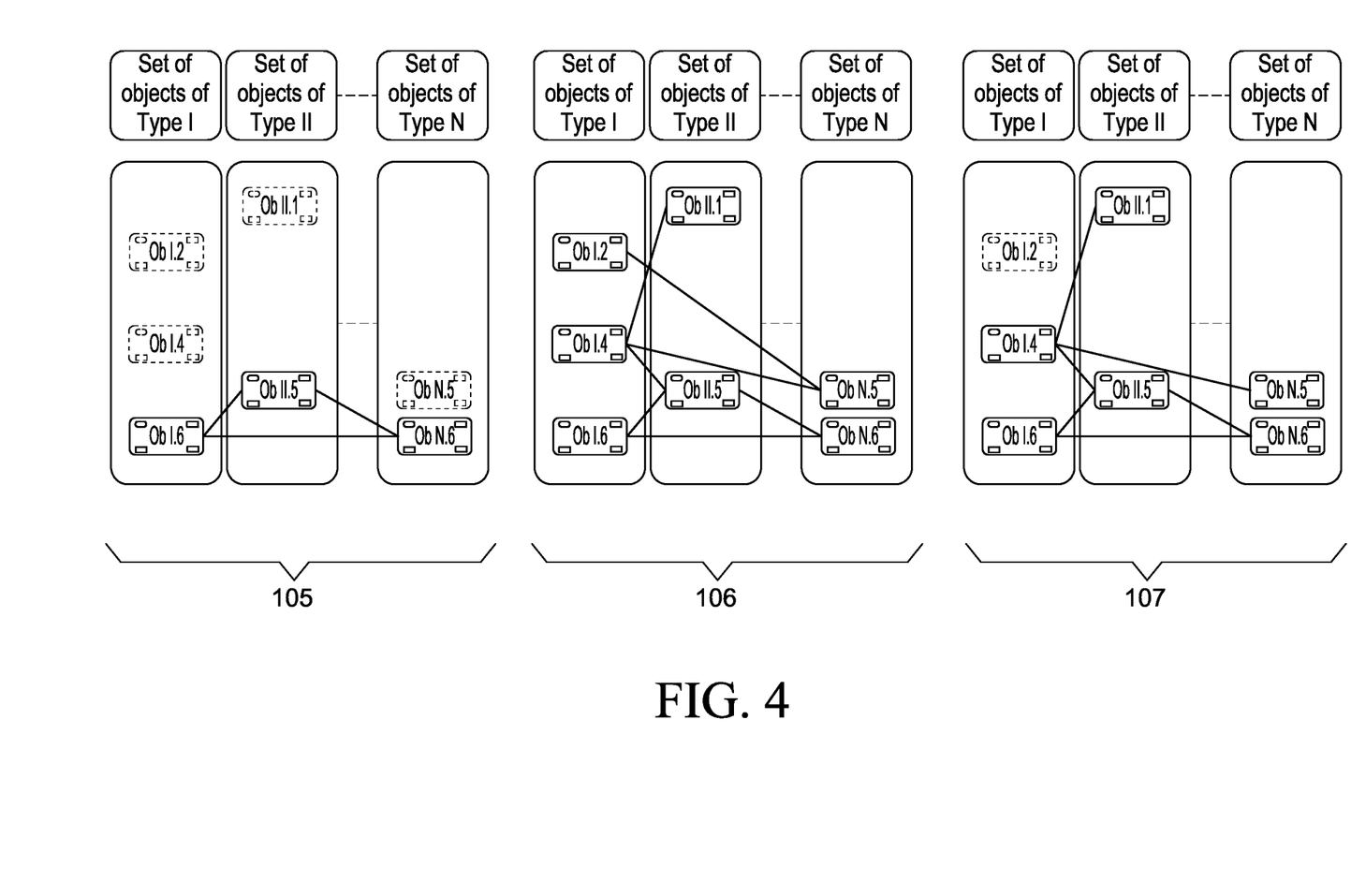
FIG. 4 illustrates the results of each of the three types of object selection, including object intersection, object union and object combination.

The outcome of object intersection is illustrated in organization area 105 of FIG. 4.

Object union operates as a standard mathematical operation "OR" (i.e., all objects that are present in any of the sets will be the result of the operation).

If object union is selected, the flowchart 100 proceeds from step 114 to step 123 which reads location and relations of existing objects. The flowchart 100 then proceeds to step 124 which selects objects that exist in any set (OR operator). The flowchart 100 then proceeds to step 125 which drops objects that do not match the operation requirements.

The outcome of object union is illustrated in organization area 106 of FIG. 4.

In the example above, all remaining objects (e.g., virtualization servers, data stores and virtual servers) that remained after the selection remain. In this case, no different outcome is produced by the operation because all the objects already fulfilled conditions of the operator even before it was applied.

For example, all remaining objects (detached houses, SUV cars, female persons) that remained after the selection are kept. In this simple case, no different outcome is produced by the operation because all the objects already fulfilled conditions of the operator even before it was applied.

In the combination of intersection and union, in FIG. 4, all objects of the sets II and N will remain, but the Ob I.2 will drop because it does not have any relation to at least one member of each subset, the new set (II|N), Ob I.4 and II.5 will remain.

If object combination is selected, the flowchart 100 proceeds from step 114 to step 126 which reads location and relation of existing objects. The flowchart 100 then proceeds to step 127 which selects objects that exist in all the sets. The flowchart 100 then proceeds to step 128 which determines whether all objects from set I are connected to at least one object in every other set. If no, the flowchart 100 then proceeds to step 129 which drops all objects of the selected group.

If yes, the flowchart 100 then proceeds to step 130 which saves the result. The flowchart 100 then proceeds to step 131 which drops objects that do not match the operation requirements.

The outcome of object combination is illustrated in organization area 107 of FIG. 4.

In contrast to object intersection, the objects in the new set (II|N) do not need to have connections with each other. However, members of set I must have a connection to at least one member of either set, II and N, in order to remain after final operation (I&II|N).

In the example above, all virtual servers and all data stores (regardless of whether they are mounted to any of virtual servers) are listed. All virtualization servers that host at least one virtual server and are connected to at least one data store remain; those that only host a virtual server but have no data store or have a data store mounted but do not host any virtual server, are dropped.

For example, assuming the persons are members of set I, houses are in set II and cars in set III. Firstly, all detached houses and all SUV cars (regardless whether they ever park in the houses) are listed. Secondly, all females that inhabit a detached house and drive a SUV car, without ever using that car for coming to that house, stay. All females who only inhabit a detached house but drive no SUV or drive an SUV but live in other estate but a detached house, are dropped.

FIG. 4 illustrates the results of each of the three types of object selection, including object intersection, object union and object combination.

Figure 5:
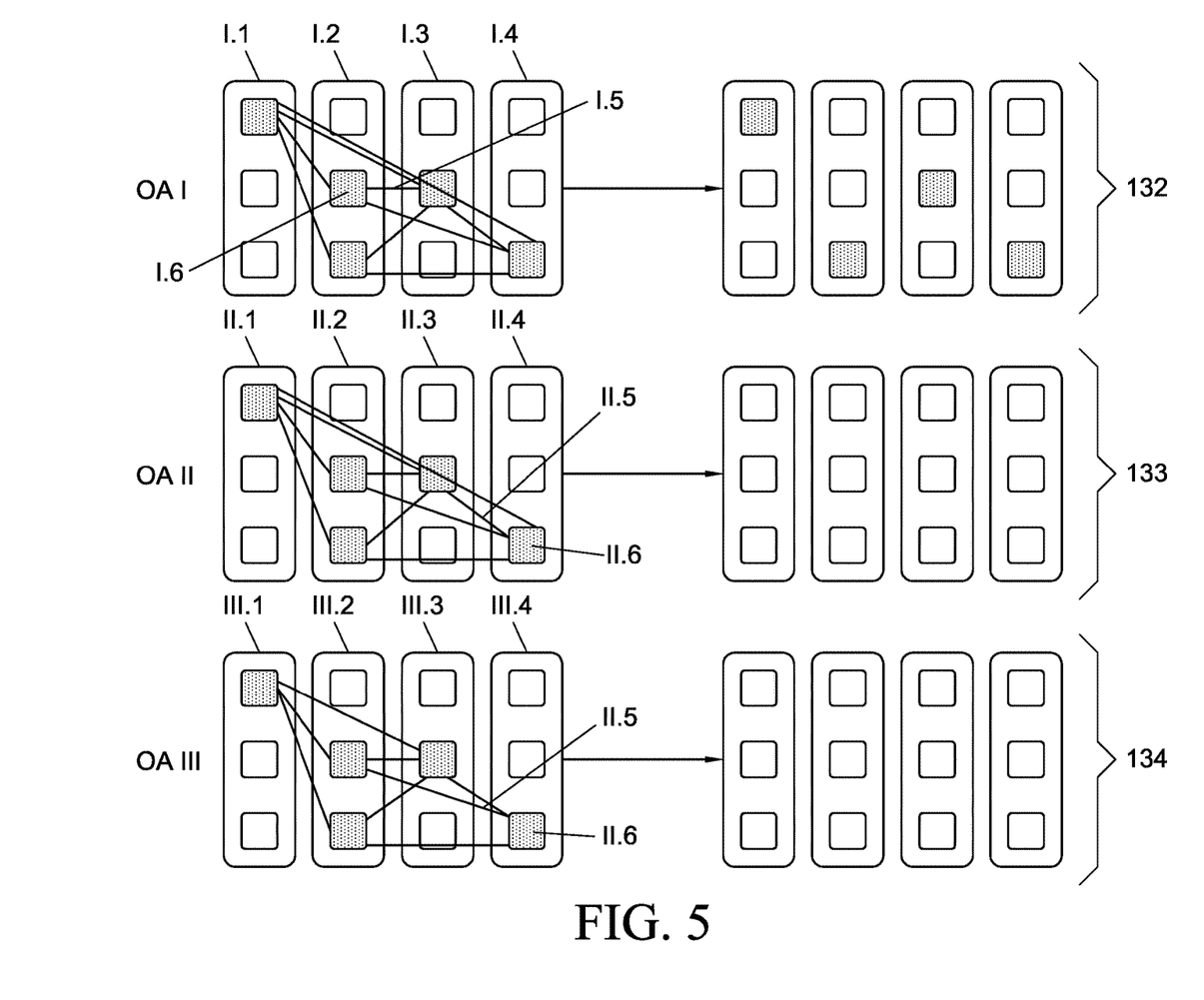
FIG. 5 illustrates a block diagram of the behavior of the object selection process.

FIG. 5 illustrates a block diagram of the behavior of the object selection process.

There are three OAs illustrated in FIG. 5 which show for all of them how the object selection changes for groups if the relation of the object is changed.

For example, in FIG. 5, OA I 132 has objects that are relatable in all the selected sets. Set I.2 includes two selected objects of the group, the other sets each have one. If the relation represented by the edge I.5 is lost, the condition of all the objects in all sets must be interconnected is not fulfilled for the object I.6 and the object is then dropped. The condition of having at least one object of the selected group in each set still exists and it is met. The result will return all the other objects except I.6.

For example, in FIG. 5, OA II 133 have objects that are relatable in all the selected sets. If the relation II.5 is lost, the condition of all the objects in all sets must be interconnected is not fulfilled for the object II.6. The set II.4 would be empty after the object II.6 is removed from the group. Since the condition of having at least 1 object of the selected group in each set still exist and it is not met, all object of the group are dropped and the result is an empty set for this query.

For example, in FIG. 5, OA III 134 have three relatable types of object in sets III.1, III.2 and III.3. The type of object in set III.4 is not relatable to the type of set III.1. If the relation III.5 is lost the condition of having at least one object of the selected group in each set still exist and it is not met. All object of the group are dropped and the result is an empty set for this query. That means that even though there is no relation between III.1 and III.4, as it technically cannot be, the other objects must still be interconnected among them whenever a connection is technically possible to keep in the group.

The operator may be used for all purposes when finding relationships among objects of different types is required within a described system. The system may be heterogeneous (i.e., consisting of member of different technical and logical types).

A topology of the system must be determinable (i.e., relations and characteristics of the members must be known or retrievable). This may be either through information in the configuration database ("CMDB") or must be available by inquiring the systems' parameters.

The $\&_R$ operator may be used to retrieve objects of interest. This is useful when large number of queries must be made over large number of sets of impacted objects. Results can be then retrieved in an efficient and fast manner. This can be used for a network connecting servers and switches across several data centers, providing services to multiple clients. Server, business applications, network ports, data centers, clients, support personnel may be types of objects.

For example, to find relations for all impacted ports by intervention of support personnel, the $\&_R$ or r-AND operators (which are different notations of the same operator) may be used (e.g., ports, staff members and changing relationships between those two types).

The power of the method is multiplied with a growing number of queries to fetch systems' objects of interests for various situations. The situation must be known (e.g., who of the support personnel did latest intervention on network ports with decreased speed of data transmission, so in a situation where no natural link between these two objects is obvious, the situation description will form the query that will be processed using the operator).

The use of an operator may not be limited to computer systems. It may be used for others, like a person's relation to other people, communities, services or places of presence. This must be, however, done through having all information in a digital format to be able to retrieve the topology of such a system, meaning that objects to be inquired may be of a technical or biological type, but must be represented by a digital model.

An example of pseudocode for the current embodiment is described below. A check defines a set of objects and a sentence is a combination of checks. The syntax of a sentence is as follows:

Sentence→Check
Sentence→Sentence|Sentence
Sentence→Sentence $\&_R$ Sentence
Sentence→(Sentence)

A sentence is normalized if and only if it is in the form of a single check, or it is in the form of left operator right, where the operator is one of $\{|, \&_R\}$ and both left and right parts are in the form of (Sentence).

That is, a sentence is normalized if it does not contain any operators, or if each argument of each operator contained in the sentence is explicitly delimited by parentheses.

Every sentence can be normalized. The semantics of the operators, together with the entire process of scanning and analyzing the configuration of an OA of the current embodiment, are described by the pseudocode below:

```
function ANALYZE:
    collect data from OA
    execute all checks from all sentences on the collected data
    for each normalized sentence s:
        EVALUATE(s)
function EVALUATE(Sentence s):
    if (s consists of a single check)
        return s.check.result
    else
        resultLeft = EVALUATE(s.left)
        resultRight = EVALUATE (s.right)
        for (t in resultLeft.types ∪ resultRight.types)
            if (s.operator == | )
                result[t] = resultLeft[t] ∪ resultRight[t]
            if (s.operator == &_R)
                if (resultLeft.types contains t)
                    if (resultRight.types contains t)
                        result[t] = resultLeft[t] ∩ resultRight[t]
                    else
                        result[t] = resultLeft[t] ∩ RESTRICT_BY_ RELATIONS(t, resultRight,
```

```
                    resultLeft)
                else
                    result[t] = RESTRICT_BY_RELATIONS(t, resultLeft, resultRight) ∩
                    resultRight[t]
    return result
function RESTRICT_BY_RELATIONS(Type t, Result resultToBeRestricted, Result
resultOther):
    relatedTypes = GET_RELATED_TYPES(t, resultToBeRestricted.types)
    if (relatedTypes = = ∅)
        return resultOther[t]
    else
        result = resultOther[t]
        for (t' in relatedTypes \ t):
            result = result ∩resultToBeRestricted[t']
        return result
function GET_RELATED_TYPES(Type t, Set < Type > types):
return those types t' from the supplied set of types that are related to t
```

This function is defined by the target domain, usually in the form of a simple lookup structure enumerating types related to each type.

The function ANALYZE performs collection of the input data and evaluates all sentences submitted for processing. The function EVALUATE analyzes and evaluates a single sentence and determines which objects from the environment are affected by definitions of a particular sentence. The function RESTRICT_BY_RELATIONS is a helping function used internally in the analysis to exclude objects from the analysis based on their relations to other objects. The function GET_RELATED_TYPES returns those types from the supplied set of types that are related to the one given type.

Figure 6:
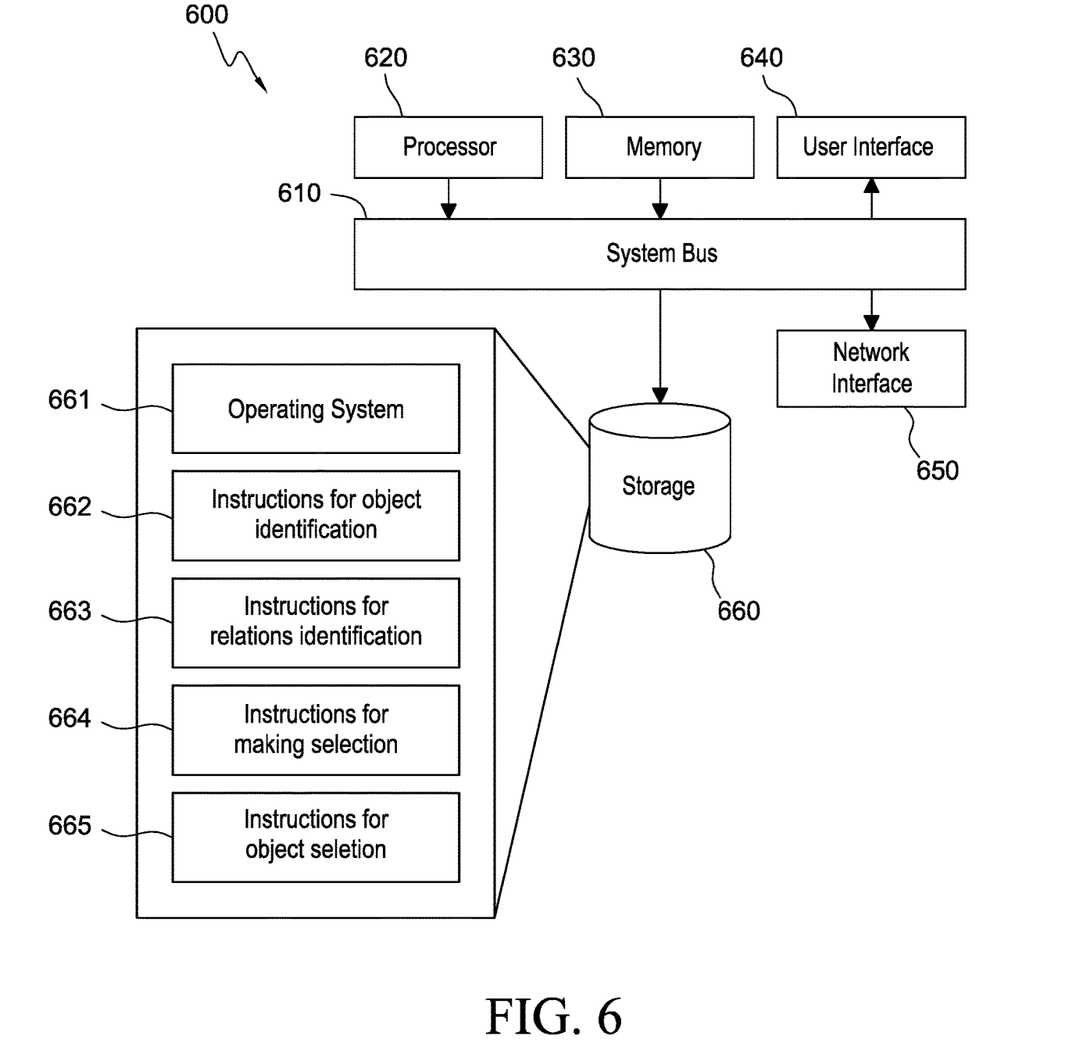
FIG. 6 illustrates a block diagram of a real-time data processing system of the current embodiment.

FIG. 6 illustrates a block diagram of a real-time data processing system of the current embodiment.

The processor 620 may be any hardware device capable of executing instructions stored in memory 630 or storage 660 or otherwise processing data. As such, the processor may include a microprocessor, field programmable gate array (FPGA), application-specific integrated circuit (ASIC), or other similar devices.

The memory 630 may include various memories such as, for example L1, L2, or L3 cache or system memory. As such, the memory 630 may include static random access memory (SRAM), dynamic RAM (DRAM), flash memory, read only memory (ROM), or other similar memory devices.

The user interface 640 may include one or more devices for enabling communication with a user such as an administrator. For example, the user interface 640 may include a display, a mouse, and a keyboard for receiving user commands. In some embodiments, the user interface 640 may include a command line interface or graphical user interface that may be presented to a remote terminal via the network interface 650.

The network interface 650 may include one or more devices for enabling communication with other hardware devices. For example, the network interface 650 may include a network interface card (NIC) configured to communicate according to the Ethernet protocol. Additionally, the network interface 650 may implement a TCP/IP stack for communication according to the TCP/IP protocols. Various alternative or additional hardware or configurations for the network interface 650 will be apparent.

The storage 660 may include one or more machine-readable storage media such as read-only memory (ROM), random-access memory (RAM), magnetic disk storage media, optical storage media, flash-memory devices, or similar storage media. In various embodiments, the storage 660 may store instructions for execution by the processor 620 or data upon with the processor 620 may operate. For example, the storage 660 may store a base operating system 661 for controlling various basic operations of the hardware 600. Storage 662 may store instructions for object identification. Storage 663 may store instruction for relations identification. Storage 664 make store instructions for making selection. Storage 665 make store instructions for object selection.

It will be apparent that various information described as stored in the storage 660 may be additionally or alternatively stored in the memory 630. In this respect, the memory 630 may also be considered to constitute a "storage device" and the storage 660 may be considered a "memory." Various other arrangements will be apparent. Further, the memory 630 and storage 660 may both be considered to be "non-transitory machine-readable media." As used herein, the term "non-transitory" will be understood to exclude transitory signals but to include all forms of storage, including both volatile and non-volatile memories.

While the host device 600 is shown as including one of each described component, the various components may be duplicated in various embodiments. For example, the processor 620 may include multiple microprocessors that are configured to independently execute the methods described herein or are configured to perform steps or subroutines of the methods described herein such that the multiple processors cooperate to achieve the functionality described herein. Further, where the device 600 is implemented in a cloud computing system, the various hardware components may belong to separate physical systems. For example, the processor 620 may include a first processor in a first server and a second processor in a second server.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media and excludes transitory signals.

It should be appreciated by those skilled in the art that any blocks and block diagrams herein represent conceptual views of illustrative circuitry embodying the principles of the invention. Implementation of particular blocks can vary while they can be implemented in the hardware or software domain without limiting the scope of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Accordingly, it is to be understood that the above description is intended to be illustrative and not restrictive. Many embodiments and applications other than the examples provided would be apparent upon reading the above description. The scope should be determined, not with reference to the above description or Abstract below, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for discovering a group of interdependent computing objects within an undirected graph structure of objects in a computing environment, the method comprising the steps of:
performing object identification;
performing relations identification;
selecting objects by performing the steps comprising:
defining required properties;
matching the required properties with the properties for each of the objects;
dropping the objects which have at least one of the properties which do not match with the required properties;
making a selection by performing object intersection on the objects by performing the steps of:
reading location and the relations for each of the objects;
selecting a group including each of the objects in the sets of objects which are identical based on the relations for each of the objects;
determining whether each of the objects in the group are related to each of the objects in each of the sets of objects, and
determining whether at least one of the objects in each of the sets of objects is related to at least one of the objects in another set of the sets of objects.

2. The method for discovering a group of interdependent computing objects within an undirected graph structure of objects in the computing environment of claim 1, the method comprising the steps of:
performing the object identification by performing the steps comprising:
receiving a search query including objects and operators;
selecting an organization area;
isolating object types for the objects in the search query;
grouping the objects into sets of objects, and
recording properties for each of the objects.

3. The method for discovering a group of interdependent computing objects within an undirected graph structure of objects in the computing environment of claim 1, the method comprising the steps of:
performing the relations identification by performing the steps comprising:
recording relatability for each of the object types for the objects, and
recording relations for each of the objects.

4. The method for discovering a group of interdependent computing objects within an undirected graph structure of objects in the computing environment of claim 1, the method comprising the steps of:
making a selection by performing object intersection on the objects by performing the steps of:
dropping all of the objects from the group when each of the objects in the group are not related to each of the objects in each of the sets of objects.

5. The method for discovering a group of interdependent computing objects within an undirected graph structure of objects in the computing environment of claim 1, the method comprising the steps of:
making a selection by performing object intersection on the objects by performing the steps of:
dropping all of the objects from the group when each of the sets of objects is not related to at least one of the objects in another set of the sets of objects.

6. The method for discovering a group of interdependent computing objects within an undirected graph structure of objects in the computing environment of claim 1, the method comprising the steps of:
making a selection by performing object union on the objects by performing the steps of:
reading location and the relations for each of the objects, and
selecting each of the objects that are in each of the sets of objects.

7. The method for discovering a group of interdependent computing objects within an undirected graph structure of objects in the computing environment of claim 6, the method comprising the steps of:
  making a selection by performing object union on the objects by performing the steps of:
    dropping each of the objects that are not in each of the sets of objects.

8. The method for discovering a group of interdependent computing objects within an undirected graph structure of objects in the computing environment of claim 1, the method comprising the steps of:
  making a selection by performing object combination on the objects by performing the steps of:
    reading location and the relations for each of the objects;
    selecting each of the objects that are in each of the sets of objects, and
    determining whether each of the objects in a first set of objects is related to at least one the objects in a second set of objects.

9. The method for discovering a group of interdependent computing objects within an undirected graph structure of objects in the computing environment of claim 8, the method comprising the steps of:
  making a selection by performing object combination on the objects by performing the steps of:
    dropping each of the objects in a first set of objects which is not related to at least one the objects in a second set of objects.

10. A non-transitory computer readable medium configured discovering a group of interdependent computing objects within an undirected graph structure in a computing environment, the device comprising:
  a memory; and
  a processor configured to:
    perform object identification by performing the steps comprising:
    perform relations identification by performing the steps comprising:
    make a selection by performing object intersection on the objects by performing the steps of:
      reading location and the relations for each of the objects;
      selecting a group including each of the objects in the sets of objects which are identical based on the relations for each of the objects;
      determining whether each of the objects in the group are related to each of the objects in each of the sets of objects, and
      determining whether at least one of the objects in each of the sets of objects is related to at least one of the objects in another set of the sets of objects.

11. The non-transitory computer readable medium of claim 10, the processor configured to:
  perform object identification by performing the steps comprising:
  receiving a search query including objects and operators;
  selecting an organization area;
  isolating object types for the objects in the search query;
  grouping the objects into sets of objects, and
  recording properties for each of the objects.

12. The non-transitory computer readable medium of claim 10, the processor configured to:
  perform relations identification by performing the steps comprising:
    recording relatability for each of the object types for the objects;
    recording relations for each of the objects.

13. The non-transitory computer readable medium of claim 10, the processor configured to:
  make a selection by performing object intersection on the objects by performing the steps of:
    dropping all of the objects from the group when each of the objects in the group are not related to each of the objects in each of the sets of objects.

14. The non-transitory computer readable medium of claim 10, the processor configured to:
  make a selection by performing object intersection on the objects by performing the steps of:
    dropping all of the objects from the group when each of the sets of objects is not related to at least one of the objects in another set of the sets of objects.

15. The non-transitory computer readable medium of claim 10, the processor configured to:
  make a selection by performing object intersection on the objects by performing the steps of:
    reading location and the relations for each of the objects, and
    selecting each of the objects that are in each of the sets of objects.

16. The non-transitory computer readable medium of claim 15, the processor configured to:
  make a selection by performing object intersection on the objects by performing the steps of:
    dropping each of the objects that are not in each of the sets of objects.

17. The non-transitory computer readable medium of claim 10, the processor configured to:
  make a selection by performing object intersection on the objects by performing the steps of:
    reading location and the relations for each of the objects;
    selecting each of the objects that are in each of the sets of objects, and
    determining whether each of the objects in a first set of objects is related to at least one the objects in a second set of objects.

18. The non-transitory computer readable medium of claim 17, the processor configured to:
  make a selection by performing object intersection on the objects by performing the steps of:
    dropping each of the objects in a first set of objects which is not related to at least one the objects in a second set of objects.

* * * * *